US011431498B2

(12) United States Patent
Goncalves et al.

(10) Patent No.: US 11,431,498 B2
(45) Date of Patent: Aug. 30, 2022

(54) QUANTUM-AUGMENTABLE HYBRID ENCRYPTION SYSTEM AND METHOD

(71) Applicants: NXM Labs Canada Inc., Toronto (CA); Ryerson University, Toronto (CA)

(72) Inventors: Brian Goncalves, Toronto (CA); Atefeh Mashatan, Toronto (CA); Jay Fallah, Toronto (CA); Kristopher Byrne, Toronto (CA); Prathap Siddavaatam, Toronto (CA)

(73) Assignees: NXM Labs, Inc., Mountain View, CA (US); Reyerson University, Toronto (CA)

( * ) Notice: Subject to any disclaimer, the term of this patent is extended or adjusted under 35 U.S.C. 154(b) by 81 days.

(21) Appl. No.: 16/789,304

(22) Filed: Feb. 12, 2020

(65) Prior Publication Data

US 2020/0259647 A1 Aug. 13, 2020

Related U.S. Application Data

(60) Provisional application No. 62/804,621, filed on Feb. 12, 2019.

(51) Int. Cl.
*H04L 9/40* (2022.01)
*H04L 9/30* (2006.01)
(Continued)

(52) U.S. Cl.
CPC .............. *H04L 9/30* (2013.01); *H04L 9/0825* (2013.01); *H04L 9/0869* (2013.01); *H04L 9/3236* (2013.01); *G06N 10/00* (2019.01)

(58) Field of Classification Search
CPC ....... H04L 9/30; H04L 9/0825; H04L 9/3236; H04L 9/0869; H04L 63/045; G06N 10/00
See application file for complete search history.

(56) References Cited

U.S. PATENT DOCUMENTS

| 2003/0235307 A1* | 12/2003 | Miyamoto | ................ H04L 9/14 380/269 |
| 2007/0283158 A1* | 12/2007 | Danseglio | ............. H04L 9/3239 713/180 |

(Continued)

OTHER PUBLICATIONS

Bindel, N., Brendel, J., Fischlin, M., Goncalves, B., Stebila, D.: Hybrid Key Encapsulation Mechanisms and Authenticated Key Exchange. In: Ding, J., Steinwandt, R. (eds.) Post-Quantum Cryptography, pp. 206-226. Springer International Publishing, Cham (2019).

(Continued)

*Primary Examiner* — Thaddeus J Plecha
(74) *Attorney, Agent, or Firm* — Hodgson Russ LLP (57) ABSTRACT

A hybrid encryption scheme links a first public key encryption (PKE) scheme with a second PKE scheme through a true random or pseudo-random element, which is used by a sender to encapsulate a symmetrically encrypted message and its associated symmetric key to generate a pair of ciphertexts for transmission to a recipient. The recipient decrypts and decapsulates the ciphertexts, retrieves the random element, and may conduct one or more verification steps to ensure that the ciphertexts were well-formed, and to detect any re-encryption or encapsulation attacks. To encrypt a message, the message and initial random value are encrypted with a symmetric key to provide an intermediate ciphertext. The symmetric key and the encrypted message-value are each encapsulated by distinct algorithms using distinct values derived from the initial random value, such as different hashes, and public keys to provide first and second ciphertexts.

20 Claims, 8 Drawing Sheets

(51) Int. Cl.
  *H04L 9/08* (2006.01)
  *H04L 9/32* (2006.01)
  *G06N 10/00* (2022.01)

(56) References Cited

U.S. PATENT DOCUMENTS

2013/0073850 A1* 3/2013 Zaverucha ............ H04L 9/0869
  713/168
2019/0245682 A1* 8/2019 Alwen ...................... H04L 9/16

OTHER PUBLICATIONS

Asmuth, C., Blakley, G.: An Efficient Algorithm for Constructing a Cryptosystem Which is Harder to Break than Two Other Cryptosystems. Computers & Mathematics with Applications 7(6), 447-450 (1981). https://doi.org/https://doi.org/10.1016/0898-1221(81)90029-8, http://www.sciencedirect.com/science/article/pii/0898122181900298.

Dodis, Y., Katz, J.: Chosen-Ciphertext Security of Multiple Encryption. In: Kilian, J. (ed.) Theory of Cryptography. pp. 188-209. Springer Berlin Heidelberg, Berlin, Heidelberg (2005).

Zhang, C., Cash, D., Wang, X., Yu, X., Chow, S.S.M.: Combiners for Chosen-Ciphertext Security. In: Dinh, T.N., Thai, M.T. (eds.) Computing and Combinatorics. pp. 257-268. Springer International Publishing, Cham (2016).

Cramer, R., Shoup, V.: Design and Analysis of Practical Public-Key Encryption Schemes Secure Against Adaptive Chosen Ciphertext Attack. SIAM J. Comput. 33(1), 167-226 (2003). https://doi.org/10.1137/S0097539702403773, http://dx.doi.org/10.1137/S0097539702403773.

Hohenberger, S., Lewko, A., Waters, B.: Detecting Dangerous Queries: A New Approach for Chosen Ciphertext Security. In: Pointcheval, D., Johansson, T. (eds.) Advances in Cryptology—EUROCRYPT 2012. pp. 663-681 (provided copy: pp. 1-24). Springer Berlin Heidelberg, Berlin, Heidelberg (2012).

Herzberg, A.: Folklore, Practice and Theory of Robust Combiners. Journal of Computer Security 17 (Jan. 2009), pp. 159-189. https://doi.org/10.3233/JCS-2009-0336.

Giacon, F., Heuer, F., Poettering, B.: KEM Combiners. In: Abdalla, M., Dahab, R. (eds.) Public-Key Cryptography—PKC 2018. pp. 190-218 (provided copy: pp. 1-29). Springer International Publishing, Cham (2018).

Harnik, D., Kilian, J., Naor, M., Reingold, O., Rosen, A.: On Robust Combiners for Oblivious Transfer and Other Primitives. In: Advances in Cryptology—EUROCRYPT 2005. pp. 96-113. Springer Berlin Heidelberg, Berlin, Heidelberg (2005).

Targhi, E.E., Unruh, D.: Post-Quantum Security of the Fujisaki-Okamoto and OAEP Transforms. In: Hirt, M., Smith, A. (eds.) Theory of Cryptography. pp. 192-216. Springer Berlin Heidelberg, Berlin, Heidelberg (2016).

Nielsen, M.A.; Chuang, I.L.: Quantum Computation and Quantum Information: 10th Anniversary Edition. Cambridge University Press 10th Anniversary Edition, 2010, pp. 1-704.

Ambainis, A., Hamburg, M., Unruh, D.: Quantum Security Proofs Using Semiclassical Oracles. In: Boldyreva, A., Micciancio, D. (eds.) Advances in Cryptology—CRYPTO 2019. pp. 269-295 (provided copy: pp. 1-45). Springer International Publishing, Cham (2019).

Bellare, M., Rogaway, P.: Random Oracles are Practical: A paradigm for Designing Efficient Protocols. In: Proceedings of the 1st ACM Conference on Computer and Communications Security, pp. 62-73 (provided copy: pp. 1-21). CCS '93, ACM, New York, NY, USA (1993). https://doi.org/10.1145/168588.168596, http://doi.acm.org/10.1145/168588.168596.

Boneh, D., Dagdelen, Ö., Fischlin, M., Lehmann, A., Schaffner, C., Zhandry, M.: Random Oracles in a Quantum World. 2011, pp. 1-38.

Unruh, D.: Revocable Quantum Timed-Release Encryption. J. ACM 62(6), 49:1-49:76 (Dec. 2015). https://doi.org/10.1145/2817206, http://doi.acm.org/10.1145/2817206.

Hofheinz, D., Kiltz, E.: Secure Hybrid Encryption from Weakened Key Encapsulation. In: Menezes, A. (ed.) Advances in Cryptology—CRYPTO 2007. pp. 553-571. Springer Berlin Heidelberg, Berlin, Heidelberg (2007).

Zhandry, M.: Secure Identity-Based Encryption in the Quantum Random Oracle Model. In: Safavi-Naini, R., Canetti, R. (eds.) Advances in Cryptology—CRYPTO 2012. pp. 758-775 (provided copy: pp. 1-27). Springer Berlin Heidelberg, Berlin, Heidelberg (2012).

Fujisaki, Eiichiro, and Tatsuaki Okamoto. "Secure integration of asymmetric and symmetric encryption schemes." Journal of cryptology 26.1 (2013): 80-101.

Herranz, J., Hofheinz, D., Kiltz, E.: Some (in)sufficient Conditions for Secure Hybrid Encryption. 208(11), 1243-1257 (2010). https://doi.org/https://doi.org/10.1016/j.ic.2010.07.002, http://www.sciencedirect.com/science/article/pii/S089054011000132X.

Kampanakis, P., Panburana, P., Daw, E., Van Geest, D.: The Viability of Postquantum X.509 Certificates. Cryptology ePrint Archive, Report 2018/063 (2018), pp. 1-18.

Bindel, N., Herath, U., McKague, M., Stebila, D.: Transitioning to a Quantum-Resistant Public Key Infrastructure. May 24, 2017, pp. 1-27.

Post-Quantum Cryptography (Jan. 2017), downloaded from URL: https://csrc.nist.gov/projects/post-quantum-cryptography, at least as early as Oct. 22, 2020, 5 pgs.

Braithwaite, M.: Google Security Blog: Experimenting with Post-Quantum Cryptography (Jul. 2016), https://security.googleblog.com/2016/07/experimenting-with-post-quantum.html, accessed Oct. 22, 2020, 4 pgs.

Langley, A.: Intent to Implement and Ship: CECPQ1 for TLS (Jul. 2016), Google group https://groups.google.com/a/chromium.org/forum/#!topic/security-dev/DS9pp2U0SAc, accessed Oct. 22, 2020, 1 pg.

* cited by examiner

QUANTUM-AUGMENTABLE HYBRID ENCRYPTION SYSTEM AND METHOD

CROSS-REFERENCE TO RELATED APPLICATIONS

This application claims the benefit of U.S. Provisional Application No. 62/804,621 filed Feb. 12, 2019, the entirety of which is hereby incorporated by reference.

TECHNICAL FIELD

The present disclosure relates to information security technology, and in particular to hybrid encryption schemes for use with both classical and quantum encryption schemes.

TECHNICAL BACKGROUND

As quantum computing becomes more accessible, interest has grown in developing cryptographic algorithms that are secure against quantum adversaries. However, it is reasonable to expect that the transition from the current classical cryptographic infrastructure to a new post-quantum (quantum-resistant) infrastructure will take several years, during which legacy systems must be maintained. Current encryption schemes employed by legacy systems, particularly public key encryption schemes, may be particularly vulnerable to attack by a quantum adversary employing a sufficiently powerful quantum computer. Furthermore, it is possible that future analysis may show that currently known post-quantum cryptography schemes are in fact vulnerable to quantum attacks, or perhaps even attacks executed on a classical computer system.

There is, therefore, a need for improved security for both classical and quantum computing systems employing public key encryption and agile cryptography, where encryption schemes can be easily upgraded to employ the most current and secure encryption schemes.

BRIEF DESCRIPTION OF THE DRAWINGS

In drawings which illustrate by way of example only preferred embodiments of the system and method.

DETAILED DESCRIPTION OF EXAMPLE EMBODIMENTS

As the development of quantum computers improve and the number of connected electronic devices increase, the threat to security and impact of quantum based attacks could be catastrophic. The need for quantum resistant data transfer exists right now, especially considering that encrypted data can be stored for future hacks using quantum computers. Accordingly, the embodiments described herein provide a system and method that solve this issue, by permitting incorporation of the most current and strongest encryption schemes in a hybrid secure encryption scheme. This hybrid scheme may scale linearly with advancements in encryption, by providing easy future upgrades to more secure cryptographic primitives. Briefly, in the exemplary embodiment described below, the hybrid secure encryption scheme links a first public key encryption (PKE) scheme with a second PKE scheme through a true random or pseudo-random element, which is used by a sender to encapsulate a symmetrically encrypted message and its associated symmetric key to generate a pair of ciphertexts for transmission to a recipient. The recipient decrypts and decapsulates the ciphertexts, retrieves the random or quasi-random element, and may conduct one or more verification steps to ensure that the ciphertexts were well-formed, and to detect any re-encryption or encapsulation attacks. This produces a tightly-bounded and secure hybrid scheme that combines any two public key encryption algorithms through any symmetric encryption algorithm, allowing for scalable adoption across many computing platforms, including in particular Internet of Things (IoT) devices, which are estimated to grow to trillions of connected devices.

In this description, while a "sender" and "recipient" are used for ease of reference, it will be understood by those skilled in the art that implementation of the hybrid secure encryption scheme does not absolutely require transmission of data from a sender to a recipient. For example, the hybrid secure encryption scheme may be employed to secure data on behalf of a user in a local or remote data storage device. Further, while both "random" and "pseudo-random" elements or values are mentioned above, for brevity in the following description reference only the term "random" is used, and should be considered as encompassing both true random and pseudo-random elements, values, and generators unless the person skilled in the art would understand from the context that only one or the other is intended.

Generally, the hybrid secure encryption scheme may be considered to include a triple of key generation, encryption, and decryption algorithms. In one embodiment the hybrid secure encryption scheme may be defined as set out in Table 1:

TABLE 1

$\Pi$.KeyGen
  1. $(pK, sK) \leftarrow \Pi^{asym}.KeyGen(1^n)$
  2. $(eK, dK) \leftarrow \kappa.KeyGen(1^n)$
$\Pi$.Enc
  1. $(C, K) \leftarrow \kappa.Encaps(eK; H_1(\Theta))$ where $\Theta \leftarrow \{0, 1\}^L$
  2. $C_i \leftarrow \Pi^{sym}.Enc(K; m\|\Theta)$
  3. $C_0 \leftarrow \Pi^{asym}.Enc(pK, C_i; H_2(\Theta))$
$\Pi$.Dec
  1. $C'_i \leftarrow \Pi^{asym}.Dec(sK, C_0)$
  2. $K' \leftarrow \kappa.Decaps(dK, C)$
  3. $m'\|\Theta' \leftarrow \Pi^{sym}.Dec(K', C'_i)$
  4. if $m'\|\Theta' = \bot$ then halt
  5. if
       (a) $C \leftarrow \kappa.Encaps(eK; H_1(\Theta'))$ and
       (b) $C_0 \leftarrow \Pi^{asym}.Enc(pK, C'_i;H_2(\Theta'))$
     then return m'
     else $\bot$ where $\Pi$ denotes the hybrid secure encryption scheme, comprising a key generation algorithm $\Pi$.Ke$_y$Gen, an encryption algorithm Π.Enc, and a decryption algorithm Π.Dec. $\Pi^{asym}$ denotes a public key encryption (PKE) scheme comprising a key generation algorithm $\Pi^{asym}$.KeyGen which, given input initialization vector $1^n$ (n∈ℕ), outputs a related pair of public and secret keys (pK, sK); $\Pi^{asym}$, an encryption algorithm which takes two inputs, a public key (e.g., pK) and a plaintext or other content, and outputs a ciphertext; and $\Pi^{asym}$Dec, a decryption algorithm that takes two inputs, a secret key (e.g., sK) and a ciphertext, and returns plaintext or other decrypted content. K denotes a key encapsulation mechanism (KEM) comprising a key generation algorithm K.KeyGen, which also takes as input $1^n$ (n∈ℕ) and outputs a related pair of public encapsulation and secret decapsulation keys (eK, dK); an encapsulation algorithm K. Encaps; and a decapsulation algorithm K.Decaps. Depending on the chosen KEM, for example FrodoKEM, encapsulation may take as input a single random value, (e.g., ∂), and using a public encapsulation key (e.g., eK) outputs both a ciphertext and symmetric key K. In other implementations of a KEM, the key K may be generated randomly then encapsulated with a random value, using the encapsulation key. The decapsulation algorithm K. Decaps takes as input a secret decapsulation key (e.g., dK) and a ciphertext and returns the related ephemeral key K. $\Pi^{sym}$ denotes a data encapsulation mechanism (DEM) or symmetric encryption scheme which may comprise a key generation algorithm $\Pi^{sym}$.KeyGen, which given input $1^n$ (n∈ℕ) outputs a secret key K; a symmetric encryption algorithm $\Pi^{sym}$.Enc, which takes as input the secret key K and a plaintext, and outputs a ciphertext; and a symmetric decryption algorithm $\Pi^{sym}$.Dec, which takes as input the ciphertext and secret key K, and returns plaintext. In each of these schemes or mechanisms, it will be appreciated that a failure of the decryption or decapsulation algorithm Π.Dec, $\Pi^{asym}$Dec, K.Decaps, $\Pi^{sym}$.Dec, for example due to incorrect input due to an attack by an adversary or data corruption, can be notionally represented by the rejection symbol ⊥ employed in Table 1.

Also in Table 1, C, $C_0$, and $C_i$ denote ciphertexts; m denotes a plaintext message; and $H_1$, $H_2$ denote two one-way functions that can be the same or different. Any suitable one-way function or functions may be used, including, but not limited to, cryptographic hash functions, key derivation functions, mask generation functions, and the like. m∥∂ denotes concatenation; however, this function may include other combinations of these two values that enable the user to retrieve m and ∂, as described below. Prime notation (', ") indicates a value derived from decryption or decapsulation that purports to be equivalent to its corresponding original value.

Briefly, in the hybrid secure encryption scheme, the public-private key pairs (pK, sK), (eK, dK) used for public key encryption are generated using $\Pi^{asym}$.KeyGen and K.KeyGen. K.Encaps generates the symmetric key K, combines K with a randomness input obtained from $H_1$(∂), and encrypts the combination with the recipient's public encapsulation key eK:

(C, K)←K.Encaps(eK; $H_1$(∂))

K is used to symmetrically encrypt a message m together with the random value ∂ to produce an intermediate ciphertext $C_i$:

$C_i$←$\Pi^{sym}$.Enc(K; m∥∂)

The hybrid secure encryption scheme thus employs a KEM-DEM paradigm, in which the KEM (K) is used to encapsulate the symmetric key that is also used to encrypt the plaintext m. This scheme is augmented by encrypting the DEM component ($\Pi^{sym}$.Enc(K; m∥∂) in Table 1, which produces $C_i$) using a further PKE scheme and randomness to produce a further ciphertext $C_0$, encrypted using the recipient's public key pK:

$C_0$←$\Pi^{asym}$.Enc(pK, $C_i$; $H_2$(∂))

Only C and $C_0$ are transmitted to a recipient; $C_i$ is not sent and may be discarded.

The recipient receives C and $C_0$, and decrypts them with dK and sK to obtain decrypted messages containing symmetric key K' and intermediate ciphertext $C'_1$, as well as the random values $H_1$(∂) and $H_2$(∂):

$C'_i$←$\Pi^{asym}$. Dec(sK, $C_0$)

K'←K.Decaps(dk, C)

Decrypted symmetric key K' may then be used to decrypt $C'_1$ to retrieve m' and ∂':

m'∥∂'←$\Pi^{sym}$.Dec(K', $C'_i$)

Using these values, the recipient can then reconstruct the ciphertexts C' and $C'_0$. If these values match the originally received ciphertexts (if . . . else in Table 1), then the message is valid and correct ∂ (and hence correct hashes) were used. It may be concluded that a re-encryption or encapsulation attack by an adversary is unlikely.

Thus, even if an adversary is has the capability to break the symmetric encryption $\Pi^{sym}$ of $C_i$, this would not be useful because they would be unable to obtain the ciphertext $C_i$ from an intercepted $C_0$ because it was combined with a random input and asymmetrically encrypted; and even if an adversary is able to break the asymmetric encryption $\Pi^{sym}$ of $C_0$ to obtain $C_i$, they would not be able to obtain the original plaintext message m from $C_i$ without also breaking the encryption of C. At the same time, both the KEM and asymmetric encryption $\Pi^{asym}$ aspects of the algorithm are enhanced by the unifying randomness of ∂, which is incorporated either directly or indirectly in each stage of encryption. The randomness protects against chosen-cipher text-type attacks (CCAs). It is possible that this hybrid secure encryption scheme may be so complex that, contrary to expectation, it would be more cost-effective for an adversary to mount a random number attack. Those skilled in the art will appreciate that typically a random number attack is expected to be more computationally costly for large enough values of L than attempting a CCA attack. Furthermore, the difficulty of a random number attack on the hybrid secure encryption scheme can be increased by increasing the length of ∂. It has been determined that the hybrid secure encryption scheme preserves IND-CCA (Indistinguishability under Chosen Ciphertext Attack) security in the random oracle model and IND-qCCA (Indistinguishability under quantum Chosen Ciphertext Attack) security in the quantum random oracle model. In other words, the hybrid secure encryption scheme may be considered secure provided that either asymmetric encryption $\Pi^{asym}$ scheme is secure or both of the KEM and DEM schemes are secure. For example, if $\Pi^{asym}$, or both $\Pi^{sym}$ and K are IND-qCCA-secure, then the resulting scheme Π may also be considered IND-qCCA-secure.

Figure 1:
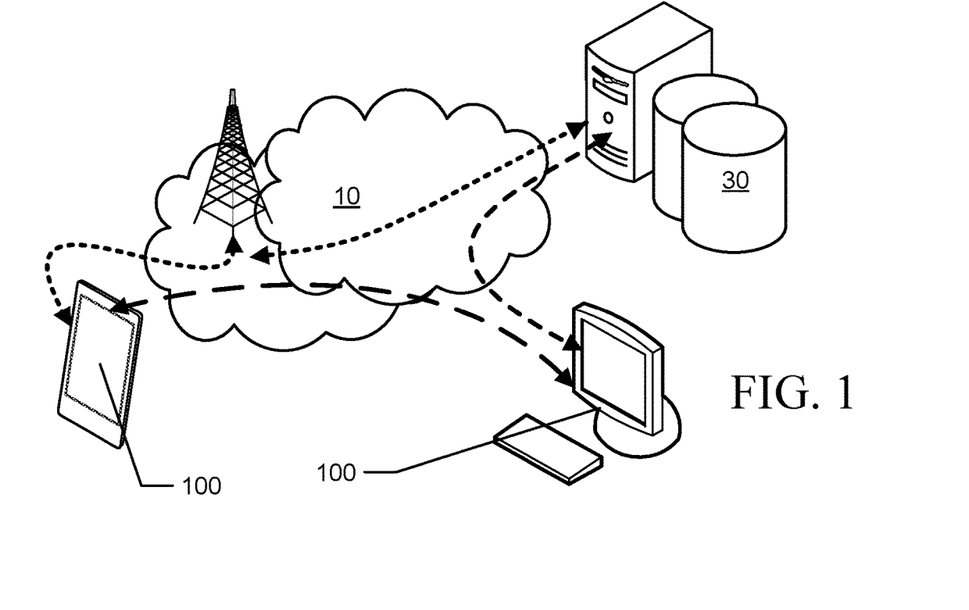
FIG. 1 is a schematic diagram of an example data communication system implementing some or all of the hybrid encryption scheme described herein

FIG. 1 is a schematic diagram illustrating an example data communication system in which the hybrid secure encryption scheme may be used. The system of FIG. 1 includes first and second data communication devices 100. These data communication devices 100 may comprise any suitable type of communication device, including, but not limited to, user communication devices such as smartphones, tablet computers, personal digital assistants, portable media players, laptop and desktop computers, smart speakers and other smart devices, building automation systems, smart meters, Internet of Things (IoT)-enabled devices and the like. The data communication devices 100 may communicate with a backend server system 30 over a wide area network 10. Server system 30 represents any appropriate execution environment to enable communication between participating devices; for example, in some implementations, the system may be a dedicated server system, while in other implementations the server system 30 represents a cloud-based system. In this example, the server system 30 includes a keystore (not shown) for storing public encryption keys associated with each user of a data communication device 100. The server system 30 may also manage communications between the data communication devices 100, although in some embodiments the data communication devices 100 communicate directly with each other, as indicated by the various dashed arrows in FIG. 1.

Figure 2:
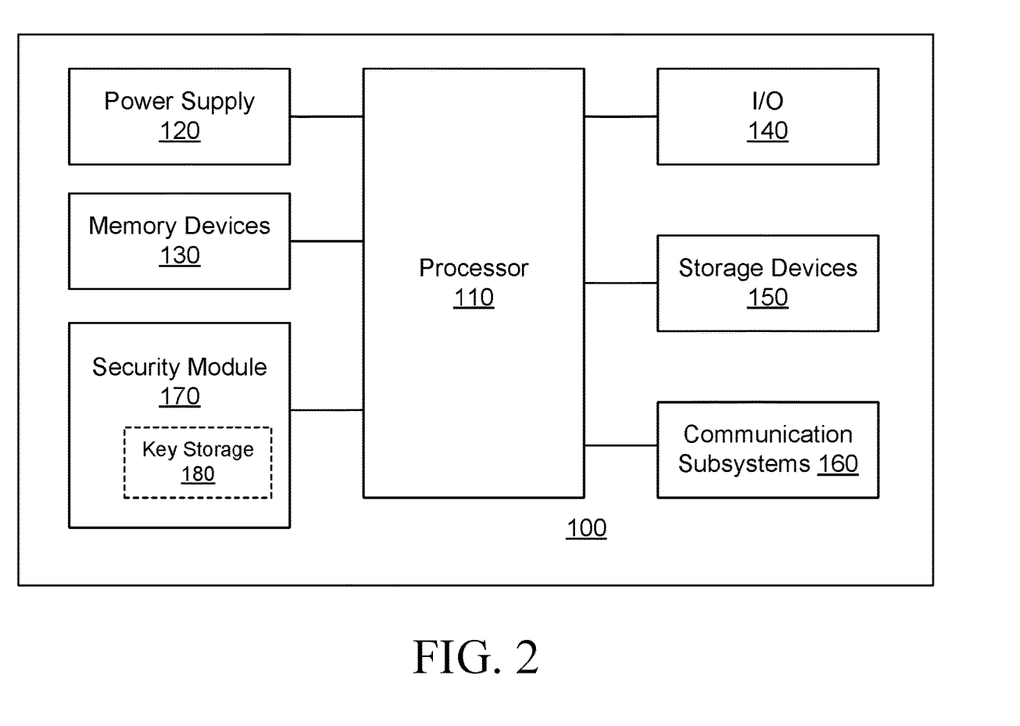
FIG. 2 is a schematic diagram of select functional components of a data communication device implementing some or all of the hybrid encryption scheme.

FIG. 2 illustrates select components of a data communication device 100. The device includes a microprocessor 110 for executing the device operating system and locally stored programming. The device 100 includes a power supply 120, which may include energy storage (e.g., a removable or non-removable battery). Volatile and non-volatile memory devices, 130 such as random access memory or flash memory, store code and data. More permanent storage is provided by any attached storage devices 150 (e.g. solid state drives, optical disks, and the like). The device also includes various input/output subsystems 140, including, but not limited to, user interface devices (e.g., keyboards, pointing devices, touchscreens, microphones and speech recognition subsystems), output devices (e.g., displays and LED arrays, speakers, haptic feedback systems), and sensor devices (e.g., light, temperature, humidity sensors, and the like). The data communication device 100 is also provided with one or more wired or wireless communication subsystems 160. In some implementations, the device 100 may be provided with a cellular transceiver for communicating with radio access networks, using one or more wireless data communication protocols and standards. The device 100 may also be provided with a wireless local area network transceiver for communicating with a wireless LAN in accordance with IEEE 802.11x standards. Additionally or alternatively, other communication protocols may be used. The communication subsystems 160 may also comprise a short-range wireless transceiver, such as a Bluetooth® transceiver 262, for communicating with a nearby device.

Cryptographic functions such as those contemplated herein may be implemented by a security module 170 resident on, or executing on, the data communication device 100. In some implementations, cryptographic functions are provided as code executable by the microprocessor 110. The security module 170 thus represents the combination of software and hardware elements required to execute the functions. In other implementations, a dedicated microprocessor (e.g., a cryptoprocessor) may be provided to implement cryptographic functions, and to provide dedicated memory for storage of encryption keys 180. In that case, the security module 170 represents the dedicated microprocessor.

Figure 3:
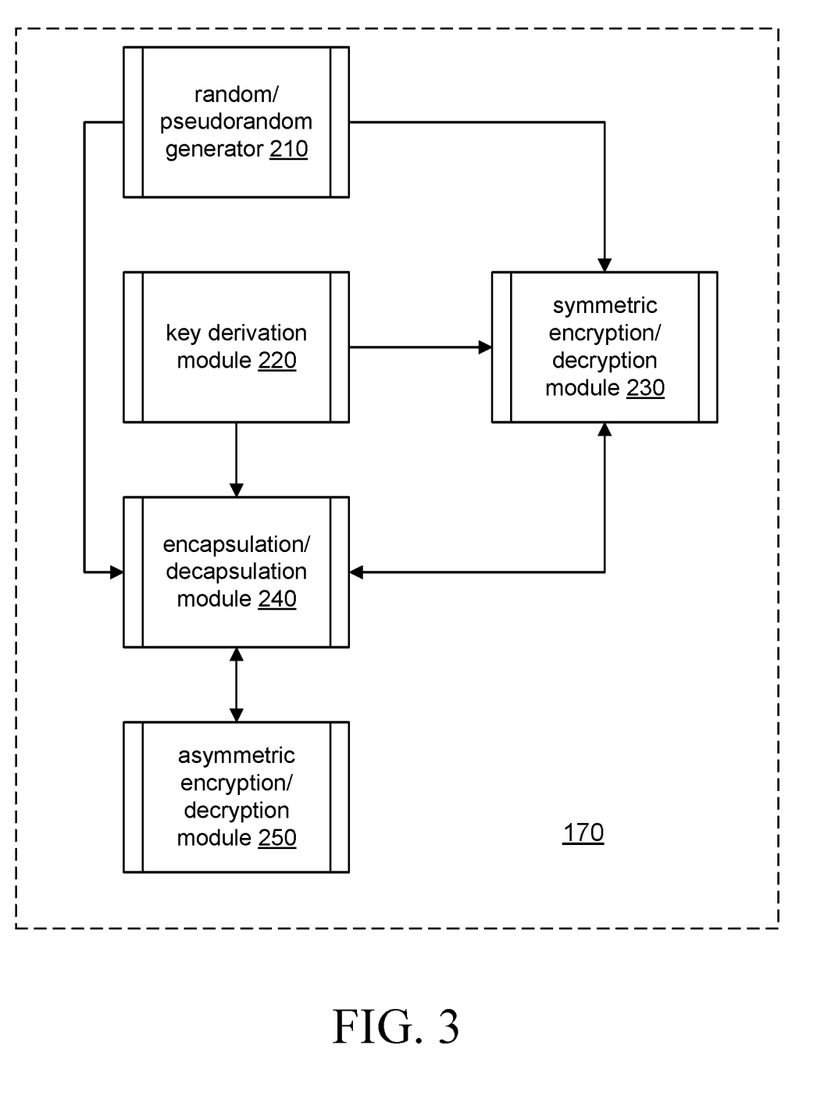
FIG. 3 is a schematic diagram of select functional components of a security module that may be implemented in the data communication system of FIG. 1.

FIG. 3 illustrates select functional modules of the security module 170, whether it is implemented in hardware, firmware, software, or a combination. To carry out the functions of the hybrid secure encryption scheme, the security module 170 includes a random number generator 210; a key derivation module 220; a symmetric encryption/decryption module 230; an encapsulation/decapsulation module 240; and an asymmetric encryption/decryption module 250. These components cooperate as described below to implement the hybrid secure encryption scheme.

Figure 4:
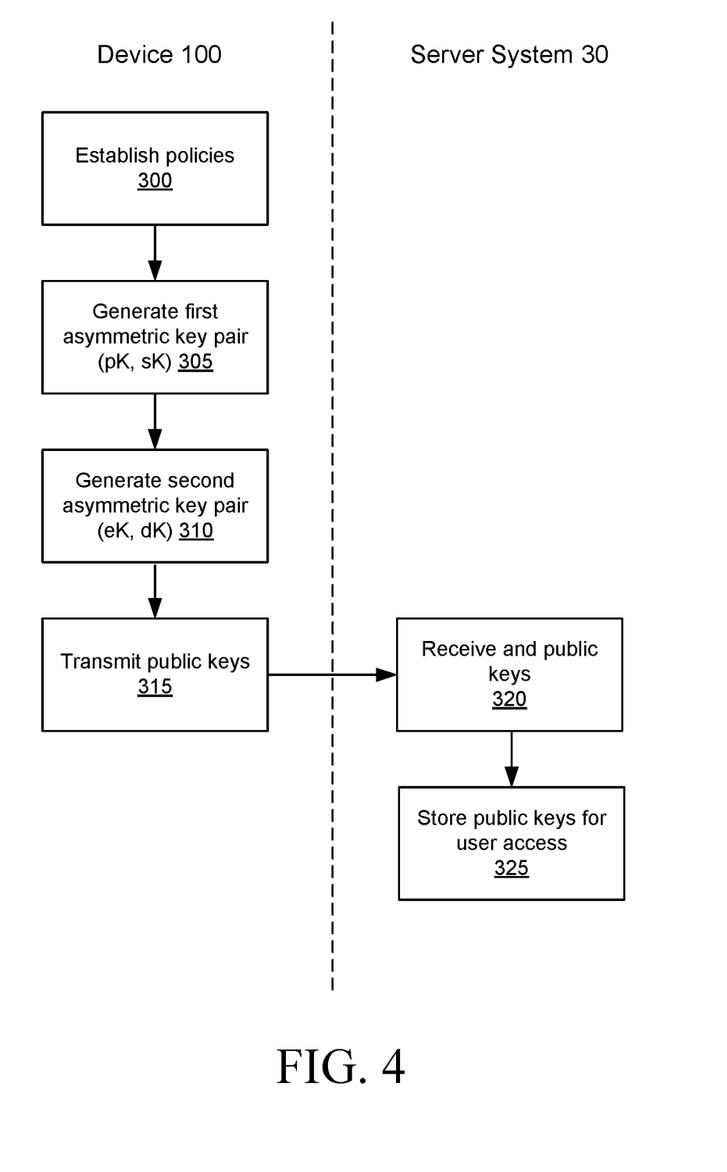
FIG. 4 is a flowchart providing an overview of a registration or set-up process for a participating user and data communication system.

FIG. 4 depicts an overview of an initialization or registration process that may be followed by each device 100 utilizing the hybrid secure encryption scheme. At 300, a device 100, such as the sender device, establishes security policies for implementing the scheme. Establishing security policies may include establishment of asymmetric and symmetric encryption, key derivation functions, and hash functions, defining length L if L is defined in advance, and key lengths, and identifying information that must be shared among participating devices. These policies may be pushed to the device 100 from a provisioning service, e.g., the server system 30, or established directly with a recipient device 100' (not shown in FIG. 3). The device 100 then generates two asymmetric key pairs 305, 310. These key pairs may be generated in accordance with the hybrid secure encryption scheme depicted in Table 1. Thus, a first public-secret key pair (pK, sK) may be generated using a selected PKE key generation algorithm $\Pi^{asym}$.KeyGen and a second public-secret key pair (eK, dK) may be generated using a selected key encapsulation algorithm K.KeyGen, given appropriate initialization vectors generated at the device 100. The public keys pK, eK of the key pairs are then transmitted at 315 to a server system 30. The server system 30 receives the public keys from the device 100 at 320, and stores them at 325 in a keystore in association with the device 100 or the user of the device 100. The public keys are made accessible to other users of the system 30.

Figure 5:
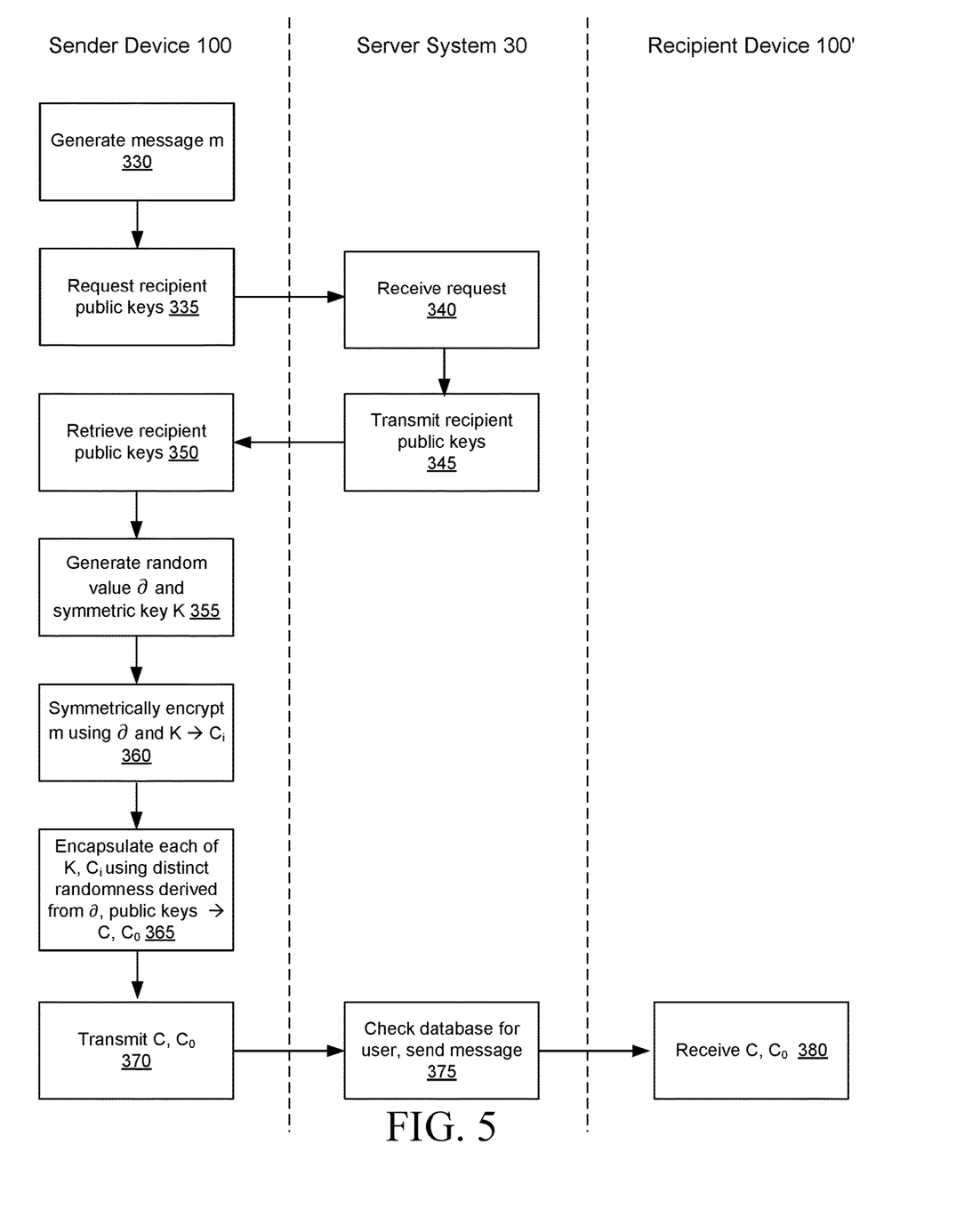
FIGS. 5 and 6 are flowcharts providing an overview of encryption and decryption aspects of a system implementing the hybrid encryption scheme.
Figure 6:
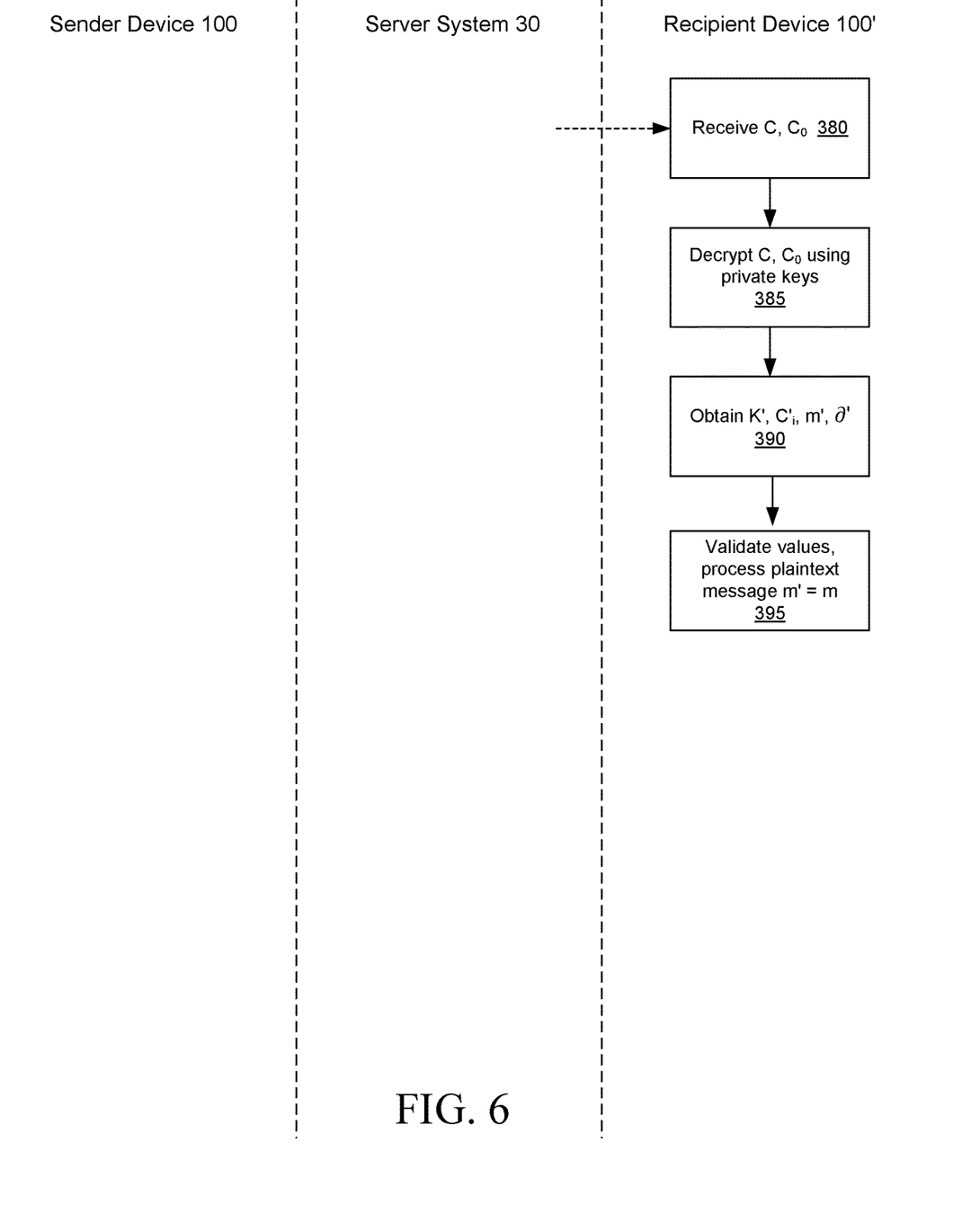

FIGS. 5 and 6 depict an embodiment of the process employing an independently generated K when a sender at a sending device 100 transmits a message to a recipient at a recipient device 100'. Starting with FIG. 5, at 330 a plaintext message m is generated at the sender device 100. On determining that the addressee of the message is the recipient of device 100', the sender device 100 determines whether it already possesses the public keys associated with the recipient. If not, the sender device 100 transmits a request 335 to the server system 30 for the recipient's public keys. The request is received by the server system at 340. Optionally, the server system 30 may permit only authorized users to access data in its keystore. If the request can be fulfilled, at 345 the server system transmits the public keys 350 of the recipient to the sender device 100.

The sender device 100 then begins the hybrid encryption process. At 355, the sender device 100 generates, for example using the random generator 210 and key derivation module 220, a random value $\partial$ of length L and a symmetric key K. At 360, the message m is concatenated with $\partial$, or otherwise combined with a in a manner so that either m or $\partial$ can be extracted by a recipient as discussed below. The combination of m and $\partial$ is encrypted by the symmetric encryption/decryption module 230 using the symmetric key K to produce intermediate ciphertext $C_i$.

At 365, the encapsulation/decapsulation module 240 then encapsulates both the symmetric key K and the intermediate ciphertext C, using the recipient's public keys, while adding distinct randomness generated from $\partial$ to each encapsulation. Values are derived from $\partial$, preferably using one-way functions, which are then combined with K or $C_i$ using a reversible function. Thus, for example, the encapsulation/decapsulation module 240 may apply two different hashing algorithms to $\partial$ to arrive at two hashes, $Hash_1$ and $Hash_2$. During encapsulation of K, a first hash (e.g., H1) is combined with K (e.g., using XOR), and the result is encrypted by asymmetric encryption/decryption module 250 using the recipient's public encapsulation key eK to produce ciphertext C; and the second hash (e.g., H2) is combined with intermediate ciphertext $C_i$ (e.g., using XOR) and encrypted using the recipient's public encryption key pK to produce ciphertext $C_0$. Thus, it will be appreciated that the resultant ciphertexts C and $C_0$ are encrypted using distinct public keys, but are linked through the inclusion of randomness generated from ∂. Because the randomness incorporated in C and $C_0$ is generated by a one-way function, the original value a is unlikely to be discovered by an adversary even if the encryption of either C or $C_0$ is broken.

In some implementations, a selected key encapsulation method (e.g., the quantum-resistant algorithm, FrodoKEM) may be used to produce an encapsulated symmetric key K without the need for an earlier preparatory step of generating K or the particular encapsulation step described above. For example, given the recipient's public key and the H1 value derived from ∂, the encapsulation method will produce the symmetric key K and an encapsulated form that can be used as C. Subsequently, the symmetric key K is used to encrypt m and ∂ to produce the intermediate ciphertext $C_i$, which can then be encrypted as described above to provide $C_0$.

The resultant ciphertexts C and $C_0$ are transmitted from the sender device 100 at 370. In the implementation depicted in FIG. 5, transmissions to a recipient are sent to the server system 30, which determines at 375 whether the recipient is a valid user. If so, the server system 30 transmits the ciphertexts C and $C_0$ to the recipient device 100', where they are received at 380. The two ciphertexts C and $C_0$ may be transmitted together or separately. Further, the server system routing the messages may be independent of the server system 30 maintaining the keystore described above. For example, the sending device 100 may transmit the ciphertexts C and $C_0$ to the recipient device 100 using any suitable public or private connection and/or communication network, including, but not limited to, cellular networks, local and wide area networks.

The decryption process on the recipient side is depicted at a high level in FIG. 6. Briefly, the decryption process reverses most steps implemented during encryption, using the corresponding private keys of the public keys used during encryption. Once received at recipient device 100', at 385 the encryption/decryption modules 250, 230 of recipient device 100' decrypt the ciphertexts C and $C_0$ to retrieve the decrypted symmetric key K', intermediate ciphertext C'$_i$, m' and ∂' at 390. If the length of ∂ is known by the recipient device, the message may be instantly found once C'$_i$ is decrypted. These decrypted values can then be used to re-encrypt the obtained values using the process 360-365 followed by the sending device 100 to generate a new C' and C'$_0$ in order to validate the received message m' at 395. If C'=C and C'$_0$=$C_0$, then the received message is valid and may be processed. If the message fails this validation check, then the message is discarded. However, the length of ∂ may be known only to the sender. In that case, extra steps are required where the receiving device cycles through m'||∂' to try different lengths of ∂' until the re-encryption process produces the correct ciphertexts C and $C_0$. This may be more secure than encryption reusing the same ∂ or a shared length L; however, the computation power required for decryption is greatly increased.

Figure 7:
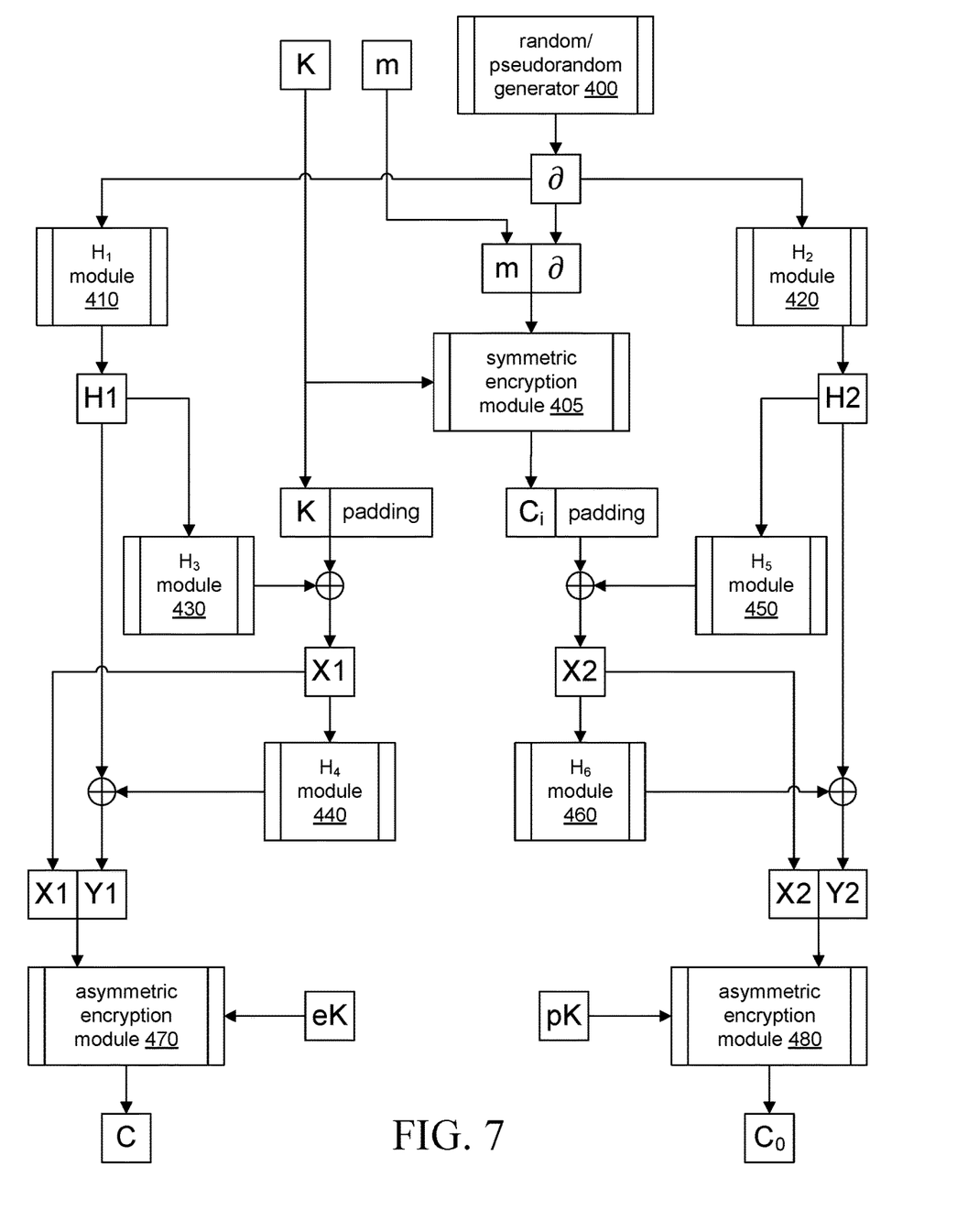
FIG. 7 is a schematic diagram illustrating an example implementation of the hybrid encryption scheme by a sending system.
Figure 8:
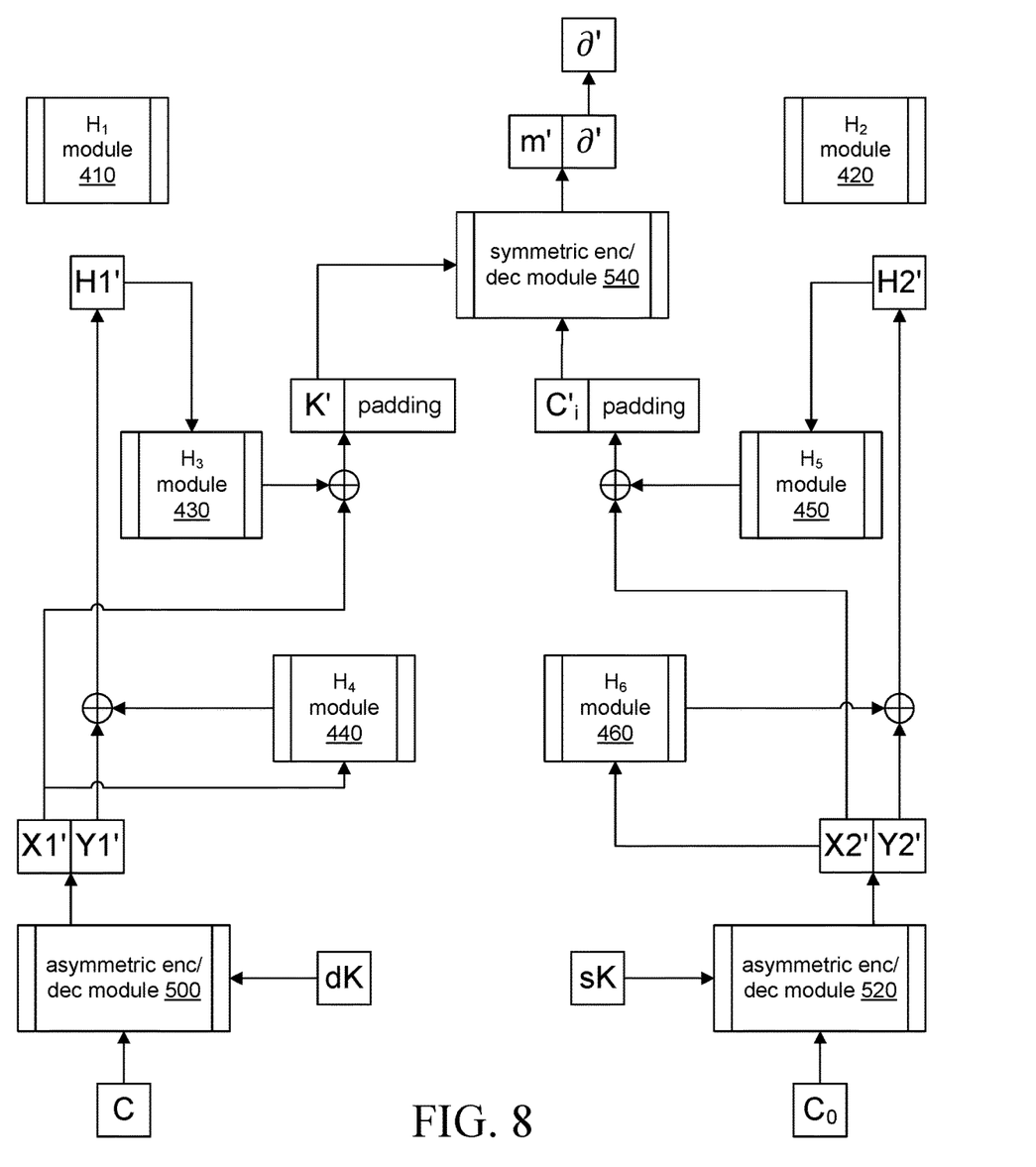
FIGS. 8 and 9 are schematic diagrams illustrating an example implementation of the hybrid encryption scheme by a receiving system.
Figure 9:
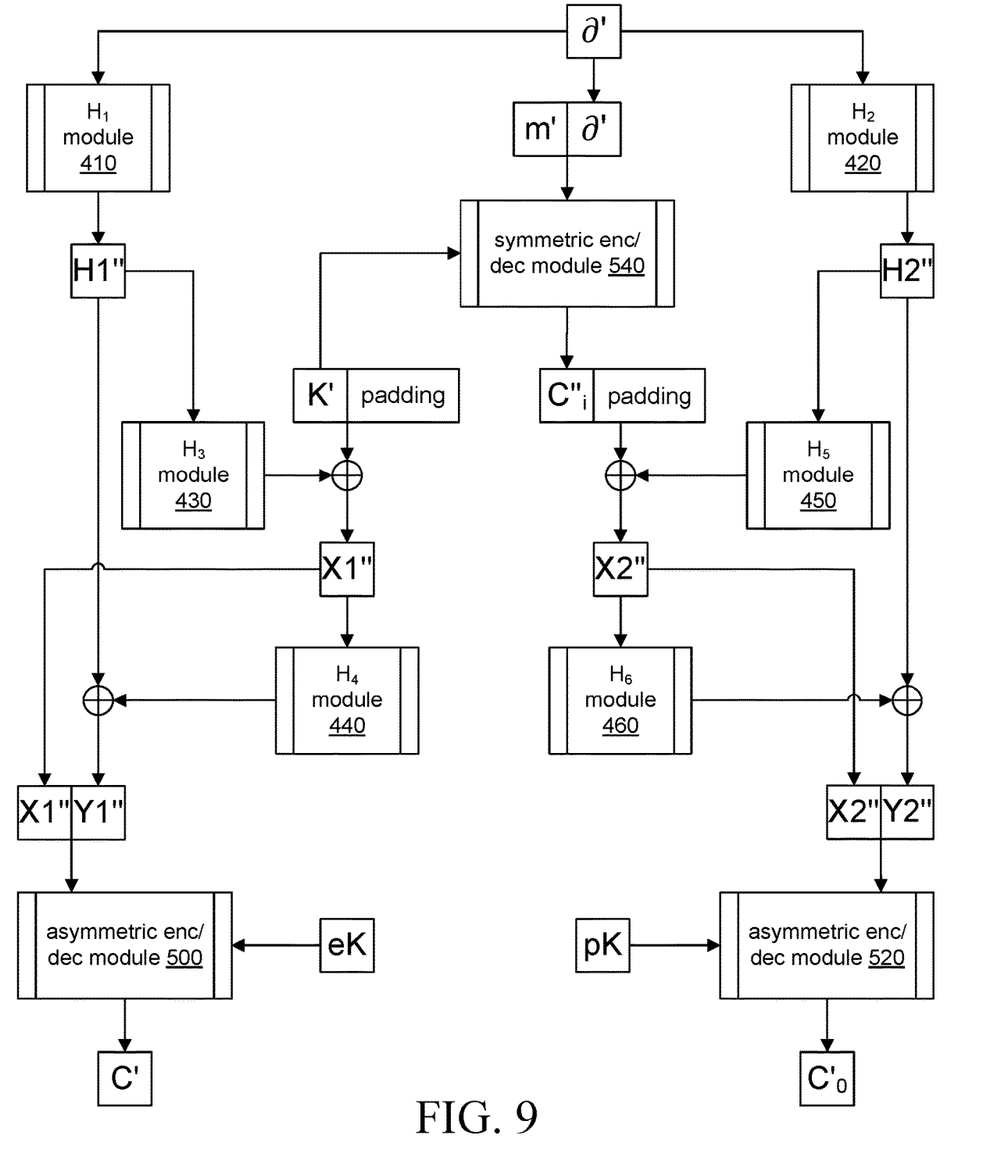

FIGS. 7-9 set out a more detailed implementation of one embodiment, showing one option for integrating the randomness generated from a into the ciphertexts C and $C_0$. FIG. 7 depicts a process and relevant functional modules at a sending device 100. In this example, the sending device 100 is presumed to include a random number generator 400; symmetric encryption module 405; one-way function modules, in this particular example cryptographic hash modules, represented schematically as modules $H_1$ 410, $H_2$ 420, $H_3$ 430, $H_4$ 440, $H_5$ 450, and $H_6$ 460; and asymmetric encryption modules 470, 480. The components 400-480 may be implemented in hardware, software, or firmware as the specific application requires. For example, as noted above, these components may be provided in a dedicated microprocessor or cryptoprocessor. It should also be noted that while the modules 410-460 are depicted as individual, discrete modules, this is only for clarity. The one-way functions implemented by two or more modules may be the same, and provided by a single block or module. For example, the functions $H_1$, $H_3$, and $H_4$ implemented by modules 410, 430, and 440 may be the same, and the functions $H_2$, $H_6$, and $H_6$ implemented by modules 420, 450, and 460 may be the same.

Asymmetric encryption modules 470, 480 each take as input a public key, and output ciphertext. While these modules are also depicted as being distinct modules, those skilled in the art will also appreciate that the asymmetric encryption function here may be represented by a single block, particularly if the same public key encryption algorithm is used for both processes. It should also be noted that while FIG. 7 depicts only encryption modules 405, 470, 480, these modules may include decryption functions as well. For the purpose of encrypting a message m for transmission to a recipient, however, a sending device 100 does not need to use decryption.

Starting from the top of FIG. 7, three initial values m, ∂, and K are provided. m is the plaintext message to be encrypted. ∂, as described above, is a random number. In FIG. 7 it is generated by the random number generator 400. A symmetric key K of a determined length is also generated. This key K may be generated by a key derivation function, as part of the selected KEM in the hybrid secure encryption scheme, or from a random number generator 400.

The value a is provided as input to one-way function $H_1$ and $H_2$ modules 410 and 420, which in this example execute different hash functions (e.g., SHA256 and HmacSHA256) to produce two different values H1 and H2. The original value a is also concatenated or otherwise combined with m. Both the symmetric key K and m~∂ are provided to the symmetric encryption module 405, which produces intermediate ciphertext $C_i$ using a symmetric-key algorithm such as the Advanced Encryption Standard (AES):

$$C_i \leftarrow \Pi^{sym}.Enc(K; m\|\partial)$$

The initial steps of the process may be altered to accommodate the selected algorithms used to produce K and the ciphertext; for example, as noted above, a preparatory step of generating the symmetric key K may not be required depending on the encapsulation mechanism employed. The symmetric key K is then padded prior to encryption. In the illustrated embodiment, the Optimal Asymmetric Encryption Padding (OAEP) scheme is used, although other schemes such as Probabilistic Signature Scheme (PSS) or even concatenation with a random value (H1) may be employed. Padded K is added to a hash of H1 produced by $H_3$ module 430 to produce a first combined value X1. X1 is provided as input to $H_4$ module 440 to obtain a further hashed value, and this hashed value is added to H1 to produce a second combined value Y1. Addition in this example is an exclusive-or function:

$$X1 \leftarrow K[padded] \oplus H_3(H1)$$

$$Y1 \leftarrow H_4(X1) \oplus H1$$

X1 and Y1 are then concatenated and encrypted by the asymmetric encryption module 450 using public encapsulation key eK to produce ciphertext C:

$$C \leftarrow K.\text{Encaps}(eK; X1\|Y1)$$

Ciphertext $C_i$ is also padded and is added to hash of H2 produced by $H_5$ module 450 to produce a first combined value X2. X2 is also provided as input to $H_6$ module 460 to produce a hashed value. This hashed value is added to H2 to produce a second combined value Y2:

$$X2 \leftarrow C_i[\text{padded}] \oplus H_5(H2)$$

$$Y2 \leftarrow H_6(X2) \oplus H2$$

X2 and Y2 are then concatenated and encrypted by the asymmetric encryption module 470 using public encryption key pK to produce ciphertext $C_0$:

$$C_0 \leftarrow \Pi^{asym}.\text{Enc}(pK, X2\|Y2)$$

Ciphertexts $C_0$ and C are then sent to the recipient.

FIG. 8 depicts a first part of the decryption process by a receiving device, such as device 100'. Again, the device is depicted as including one-way function modules 410, 420, 430, 440, 450, and 460. The one-way functions implemented by these modules correspond to the one-way functions implemented by the modules 410-460 used for encryption in FIG. 7. As noted above, these modules are shown as multiple discrete modules for clarity, and may be combinable.

Starting from the bottom, the ciphertext C is decrypted by the asymmetric encryption/decryption module 500 using the private decapsulation key dK to produce X1'||Y1'. As noted above, the prime notation signifies that the value was obtained from decryption or decapsulation and only purports to be equivalent to original X1||Y1. This equivalence can be tested at the validation stage described below.

X1' and Y1' are obtained. X1' is provided as input to the $H_4$ module 440, which implements the same hash function as the sender module 440 in the example of FIG. 7, and the output is added to Y1' to produce H1'. A hash of H1' produced by $H_3$ module 430 is added to X1' to obtain padded K'. K' may then be extracted:

$$H1' \leftarrow H_4(X1') \oplus Y1'$$

$$K'[\text{padded}] \leftarrow H_3(H1') \oplus X1'$$

The ciphertext $C_0$ is decrypted by the asymmetric encryption/decryption module 520 using the private decryption key sK to produce X2'||Y2'. X2' and Y2' are obtained. X2' is provided as input to $H_6$ module 460, which in this example implements the same hash function as the sender hash module 460 in FIG. 7, and the output is added to Y2' to produce H2'. The hash of H2' produced by $H_5$ module 450 is added to X2' to obtain padded $C'_i$. $C'_i$ may then be extracted:

$$H2' \leftarrow H_6(X2') \oplus Y2'$$

$$C'_i[\text{padded}] \leftarrow H_5(H2') \oplus X2'$$

Given $C'_i$ and K', $C'_i$ may be decrypted using the symmetric encryption/decryption module 540 and K' to produce m'||∂'. In this example, we presume that ∂ is of known length L, and therefore ∂ can be easily extracted and m' isolated. If no validation is carried out, then message m' is the final product and may be processed.

FIG. 9 illustrates the corresponding validation. m'||∂' obtained from decryption can be re-encrypted using K' to produce the same $C'_i$ previously obtained. K' and $C'_i$ are padded. a' can be provided as input to the $H_1$ and $H_2$ modules 410 and 420 which execute the same hash functions as previously. The results are hash values H1" and H2".

Padded K' is added to the hash of H1" produced by $H_3$ module 430, to produce X1". X1" is provided as input to $H_4$ module 440, and this hash value is added to H1" to produce Y1":

$$X1'' \leftarrow K'[\text{padded}] \oplus H_3(H1'')$$

$$Y1'' \leftarrow H_4(X1'') \oplus H1''$$

X1" and Y1" are then concatenated and encrypted by the asymmetric encryption/decryption module 500 using public encapsulation key eK to produce ciphertext C':

$$C' \leftarrow K.\text{Encaps}(eK; X1''\|Y1'')$$

Padded $C'_i$ is added to the hash of H2" produced by H5 module 450 to produce X2". X2" is also provided as input to $H_6$ module 460 and this hashed value is added to H2" to produce a second combined value Y2":

$$X2'' \leftarrow C'_i[\text{padded}] \oplus H_5(H2'')$$

$$Y2'' \leftarrow H_6(X2'') \oplus H2''$$

X2" and Y2" are then concatenated and encrypted by the asymmetric encryption module 520 using public encryption key pK to produce ciphertext $C'_0$:

$$C'_0 \leftarrow \Pi^{asym}.\text{Enc}(pK, X2''\|Y2'')$$

At this point, one or both of C'o and C' may be compared to originally received $C_0$ and C to determine whether they match. If the values match, then message m' is valid and may be processed. Otherwise, m' is invalid and may be discarded.

In the above example, the length L of ∂ was presumed to be known by the recipient device in order to extract m' and ∂'. The value of L may be established by the security policies initialized on each device. As mentioned above, in another implementation, the length of ∂ is not known in advance by the recipient device, and may be any arbitrary length set by the sending device. In that case, the decryption process can be carried out repetitively by the recipient device based on different estimated lengths of ∂, such that the recipient device tries different ∂' and attempts to validate the message by computing $C'_0$ and C' for each ∂' until $C'_0$ and C' match original $C_0$ and C.

Any suitable symmetric and asymmetric encryption schemes may be employed in the hybrid secure encryption scheme, according to the security needs and computing resources of the devices implementing the hybrid scheme. Thus, for example, the hybrid scheme may include at least one quantum cryptographic scheme, at least one post-quantum cryptographic scheme; and/or at least one classical cryptographic scheme; but the hybrid scheme need not be limited only to combining quantum with classical cryptographic algorithms, and in fact all algorithms used in the hybrid scheme may be classical, quantum, or post-quantum. The two asymmetric encryption/decryption modules may employ the same, or different, asymmetric schemes. The hybrid scheme may further be modified to accommodate different key encapsulation methods, such as FrodoKEM as described above, which avoids the need to implement a distinct symmetric key generation algorithm to produce the symmetric key.

It will thus be appreciated by those skilled in the art how security can be enhanced by upgrading one or more of the encryption schemes incorporated into the hybrid secure encryption scheme as the need arises. For example, in an early deployment, it may be considered that elliptic curve cryptography (ECC) or even RSA encryption may be suitable protocols for use in a hybrid secure encryption scheme, but as a need for greater security is recognized, one or both of the asymmetric algorithms used in the hybrid secure encryption scheme may be replaced by a stronger, and preferably more quantum-resistant algorithm such as NTRUEncrypt, LIMA, or RLWE-based encryption.

Thus, in one embodiment, there is provided a method, comprising: concatenating, by a processor system of a computing device, a message to be encrypted with a random value; generating a symmetric key and a first ciphertext comprising an encapsulation of the symmetric key using a value derived from the random value using at least a first one-way function and a first public key of a first asymmetric key pair; encrypting, by the processor system, the combination of the message to be encrypted and the random value with the symmetric key to provide an intermediate ciphertext; encapsulating, by the processor system, the intermediate ciphertext using a different value derived from the random value and a second public key of a second asymmetric key pair to provide a second ciphertext, the different value being derived from the random value using at least a second one-way function; and storing the first and second ciphertexts in memory of the computing device.

In one aspect, generating the symmetric key and the first ciphertext comprises providing the first public key and the value to a key encapsulation algorithm that generates the symmetric key and the encapsulation.

In another aspect, generating the symmetric key and the first ciphertext comprises: generating the symmetric key using a key generating algorithm, and encapsulating the symmetric key, comprising combining the value with the symmetric key, and encrypting the resultant combination with the first public key; encapsulating the intermediate ciphertext comprises combining the different value with the intermediate ciphertext, and encrypting the resultant combination with the second public key; and combining the message with the random value comprises concatenating the message with the random value.

In a further aspect, the random value is a true random value.

In one aspect, generating the symmetric key and the first ciphertext comprises: generating, by the processor system, the symmetric key using a key generating algorithm;

generating, by the processor system, a first symmetric key encapsulation hash value from the random value by applying a first hash function to the random value; combining, by the processor system, the symmetric key with a second symmetric key encapsulation hash value generated by applying a second hash function to the first symmetric key encapsulation hash value to provide a first combined value; combining, by the processor system, the first symmetric key encapsulation hash value with a result of applying a third hash function to the first combined value to provide a second combined value; and encrypting, by the processor system, a concatenation of the first combined value and the second combined value using the first public key to produce the first ciphertext.

In a further aspect, encapsulating the intermediate ciphertext comprises: generating, by the processor system, a first intermediate ciphertext encapsulation hash value from the random value by applying a fourth hash function to the random value; combining, by the processor system, the intermediate ciphertext with a second intermediate ciphertext encapsulation hash value generated by applying a fifth hash function to the first intermediate ciphertext encapsulation hash value to provide a third combined value; combining, by the processor system, the first intermediate ciphertext encapsulation hash value with a result of applying a sixth hash function to the third combined value to provide a fourth combined value; and encrypting, by the processor system, a concatenation of the third combined value and fourth combined value using the second public key to produce the second ciphertext.

In another aspect, the symmetric key and the intermediate ciphertext are padded prior to combining.

In a further aspect, the set of the first, second, and third hash functions is different than the set of the fourth, fifth and sixth hash functions.

In still a further aspect, the first and second ciphertexts are transmitted to a recipient, and the first and second asymmetric key pairs are asymmetric key pairs associated with the recipient.

There is also provided a method, comprising: obtaining, by a computing device comprising a processor system, a first ciphertext and a second ciphertext, decrypting, by the processor system, the first ciphertext using a first private key of a first asymmetric key pair to obtain first decrypted content comprising a first portion and a second portion; combining, by the processor system, the second portion with a first hash value generated by applying the first portion as input to a first hash function to provide a first result; combining, by the processor system, the first portion with a second hash value generated by applying the first result as input to a second hash function to provide a second result, and obtaining a symmetric key from the second result; decrypting, by the processor system, the second ciphertext using a second private key of a second asymmetric key pair to obtain second decrypted content comprising a third portion and a fourth portion; combining, by the processor system, the fourth portion with a third hash value generated by applying the third portion as input to a third hash function to provide a third result; combining, by the processor system, the third portion with a fourth hash value generated by applying the third result as input to a fourth hash function to provide a fourth result, and obtaining an intermediate ciphertext from the fourth result; decrypting, by the processor system, the obtained intermediate ciphertext using the obtained symmetric key to obtain a message and an appended value.

In a further aspect, at least a portion of the encryption method described above is employed to validate the decrypted message.

There is also provided, in a further aspect, a computing system, either classical or quantum, or a combination thereof, configured to implement one or more aspects described above. Further, there is also provided a non-transitory computer-readable medium storing code which, when executed by one or more processors of a computing system, causes the system to implement one or more of the aspects described above.

The examples and embodiments are presented only by way of example and are not meant to limit the scope of the subject matter described herein. Variations of these examples and embodiments will be apparent to those in the art and are considered to be within the scope of the subject matter described herein. For example, some steps or acts in a process or method may be reordered or omitted, and features and aspects described in respect of one embodiment may be incorporated, as the person skilled in the art will understand it to be appropriate, into other described embodiments.

The data employed by the systems, devices, and methods described herein may be stored in one or more data stores.

The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical. Code executable to configure the systems or devices to perform the methods described above may be downloaded to the memory of a device over a network, such as the Internet.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic computing devices, quantum computing devices or memory devices, capable of being logically joined for execution. Functional units may also be implemented as combinations of software and hardware, such as a processor operating on a set of operational data or instructions.

Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A method, comprising:
   concatenating, by a processor system of a computing device, a message to be encrypted with a random value;
   generating a symmetric key and a first ciphertext comprising an encapsulation of the symmetric key using a value derived from the random value using at least a first one-way function and a first public key of a first asymmetric key pair;
   encrypting, by the processor system, the combination of the message to be encrypted and the random value with the symmetric key to provide an intermediate ciphertext;
   encapsulating, by the processor system, the intermediate ciphertext using a different value derived from the random value and a second public key of a second asymmetric key pair to provide a second ciphertext, the different value being derived from the random value using at least a second one-way function; and
   storing the first and second ciphertexts in memory of the computing device.

2. The method of claim 1, wherein generating the symmetric key and the first ciphertext comprises providing the first public key and the value to a key encapsulation algorithm that generates the symmetric key and the encapsulation.

3. The method of claim 1, wherein:
   generating the symmetric key and the first ciphertext comprises:
      generating the symmetric key using a key generating algorithm, and
      encapsulating the symmetric key, comprising combining the value with the symmetric key, and encrypting the resultant combination with the first public key;
   encapsulating the intermediate ciphertext comprises combining the different value with the intermediate ciphertext, and encrypting the resultant combination with the second public key; and
   combining the message with the random value comprises concatenating the message with the random value.

4. The method of claim 1, wherein the random value is a true random value.

5. The method of claim 1, wherein generating the symmetric key and the first ciphertext comprises:
   generating, by the processor system, the symmetric key using a key generating algorithm;
   generating, by the processor system, a first symmetric key encapsulation hash value from the random value by applying a first hash function to the random value;
   combining, by the processor system, the symmetric key with a second symmetric key encapsulation hash value generated by applying a second hash function to the first symmetric key encapsulation hash value to provide a first combined value;
   combining, by the processor system, the first symmetric key encapsulation hash value with a result of applying a third hash function to the first combined value to provide a second combined value; and
   encrypting, by the processor system, a concatenation of the first combined value and the second combined value using the first public key to produce the first ciphertext.

6. The method of claim 5, wherein encapsulating the intermediate ciphertext comprises:
   generating, by the processor system, a first intermediate ciphertext encapsulation hash value from the random value by applying a fourth hash function to the random value;
   combining, by the processor system, the intermediate ciphertext with a second intermediate ciphertext encapsulation hash value generated by applying a fifth hash function to the first intermediate ciphertext encapsulation hash value to provide a third combined value;
   combining, by the processor system, the first intermediate ciphertext encapsulation hash value with a result of applying a sixth hash function to the third combined value to provide a fourth combined value; and encrypting, by the processor system, a concatenation of the third combined value and fourth combined value using the second public key to produce the second ciphertext.

7. The method of claim 6, wherein the symmetric key and the intermediate ciphertext are padded prior to combining.

8. The method of claim 6, wherein the set of the first, second, and third hash functions is different than the set of the fourth, fifth and sixth hash functions.

9. The method of claim 6, further comprising transmitting the first and second ciphertexts to a recipient, wherein the first and second asymmetric key pairs are asymmetric key pairs associated with the recipient.

10. A computer system, comprising:
a memory;
at least one processor configured to implement:
concatenating a message to be encrypted with a random value;
generating a symmetric key and a first ciphertext comprising an encapsulation of the symmetric key using a value derived from the random value using at least a first one-way function and a first public key of a first asymmetric key pair;
encrypting the combination of the message to be encrypted and the random value with the symmetric key to provide an intermediate ciphertext;
encapsulating the intermediate ciphertext using a different value derived from the random value and a second public key of a second asymmetric key pair to provide a second ciphertext, the different value being derived from the random value using at least a second one-way function; and
storing the first and second ciphertexts in memory of the computer system.

11. The computer system of claim 10, wherein generating the symmetric key and the first ciphertext comprises providing the first public key and the value to a key encapsulation algorithm that generates the symmetric key and the encapsulation.

12. The computer system of claim 11, wherein:
generating the symmetric key and the first ciphertext comprises:
generating the symmetric key using a key generating algorithm, and
encapsulating the symmetric key, comprising combining the value with the symmetric key, and encrypting the resultant combination with the first public key;
encapsulating the intermediate ciphertext comprises combining the different value with the intermediate ciphertext, and encrypting the resultant combination with the second public key; and
combining the message with the random value comprises concatenating the message with the random value.

13. The computer system of claim 10, wherein the random value is a true random value.

14. The computer system of claim 10, wherein generating the symmetric key and the first ciphertext comprises:
generating, by the at least one processor, the symmetric key using a key generating algorithm;
generating a first symmetric key encapsulation hash value from the random value by applying a first hash function to the random value;
combining the symmetric key with a second symmetric key encapsulation hash value generated by applying a second hash function to the first symmetric key encapsulation hash value to provide a first combined value;
combining the first symmetric key encapsulation hash value with a result of applying a third hash function to the first combined value to provide a second combined value; and
encrypting a concatenation of the first combined value and the second combined value using the first public key to produce the first ciphertext.

15. The computer system of claim 14, wherein encapsulating the intermediate ciphertext comprises:
generating a first intermediate ciphertext encapsulation hash value from the random value by applying a fourth hash function to the random value;
combining the intermediate ciphertext with a second intermediate ciphertext encapsulation hash value generated by applying a fifth hash function to the first intermediate ciphertext encapsulation hash value to provide a third combined value;
combining the first intermediate ciphertext encapsulation hash value with a result of applying a sixth hash function to the third combined value to provide a fourth combined value; and
encrypting a concatenation of the third combined value and fourth combined value using the second public key to produce the second ciphertext.

16. The computer system of claim 15, wherein the symmetric key and the intermediate ciphertext are padded prior to combining.

17. The computer system of claim 15, wherein the set of the first, second, and third hash functions is different than the set of the fourth, fifth and sixth hash functions.

18. The computer system of claim 15, further comprising transmitting the first and second ciphertexts to a recipient, wherein the first and second asymmetric key pairs are asymmetric key pairs associated with the recipient.

19. A method, comprising:
obtaining, by a computing device comprising a processor system, a first ciphertext and a second ciphertext,
decrypting, by the processor system, the first ciphertext using a first private key of a first asymmetric key pair to obtain first decrypted content comprising a first portion and a second portion;
combining, by the processor system, the second portion with a first hash value generated by applying the first portion as input to a first hash function to provide a first result;
combining, by the processor system, the first portion with a second hash value generated by applying the first result as input to a second hash function to provide a second result, and obtaining a symmetric key from the second result;
decrypting, by the processor system, the second ciphertext using a second private key of a second asymmetric key pair to obtain second decrypted content comprising a third portion and a fourth portion;
combining, by the processor system, the fourth portion with a third hash value generated by applying the third portion as input to a third hash function to provide a third result;
combining, by the processor system, the third portion with a fourth hash value generated by applying the third result as input to a fourth hash function to provide a fourth result, and obtaining an intermediate ciphertext from the fourth result;
decrypting, by the processor system, the obtained intermediate ciphertext using the obtained symmetric key to obtain a message and an appended value.

20. A computer system, comprising:

a memory;

at least one processor configured to implement:

obtaining a first ciphertext and a second ciphertext, decrypting the first ciphertext using a first private key of a first asymmetric key pair to obtain first decrypted content comprising a first portion and a second portion;

combining the second portion with a first hash value generated by applying the first portion as input to a first hash function to provide a first result;

combining the first portion with a second hash value generated by applying the first result as input to a second hash function to provide a second result, and obtaining a symmetric key from the second result;

decrypting the second ciphertext using a second private key of a second asymmetric key pair to obtain second decrypted content comprising a third portion and a fourth portion;

combining the fourth portion with a third hash value generated by applying the third portion as input to a third hash function to provide a third result;

combining, by the at least one processor, the third portion with a fourth hash value generated by applying the third result as input to a fourth hash function to provide a fourth result, and obtaining an intermediate ciphertext from the fourth result;

decrypting, by the at least one processor, the obtained intermediate ciphertext using the obtained symmetric key to obtain a message and an appended value.

* * * * *